Dec. 9, 1930.   F. LAGE   1,784,101

SANITARY POULTRY NEST

Filed Jan. 3, 1928

Inventor
FREDERICK LAGE
By M. Talbert Dick
Attorney

Patented Dec. 9, 1930

1,784,101

UNITED STATES PATENT OFFICE

FREDERICK LAGE, OF GLADBROOK, IOWA

SANITARY POULTRY NEST

Application filed January 3, 1928. Serial No. 244,102.

The principal object of this invention is to provide a sanitary nest for poultry that is economical in manufacture and durable in use.

A further object of this invention is to provide a poultry nest having a basket that can be readily removed from or replaced on its bracket for cleaning or replenishing with nesting material.

A still further object of this invention is to provide a sanitary poultry nest that cannot be used as a roost by the fowls.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

No phase of the poultry industry is more neglected than the nests. These nests are usually boxes or the like nailed to their supports, which makes cleaning and sanitation impossible. Such nests soon become the homes of mites and such vermin that prey upon the poultry. I have overcome these disadvantages by my sanitary poultry nest as will be appreciated by those familiar with the art.

Figure 4:
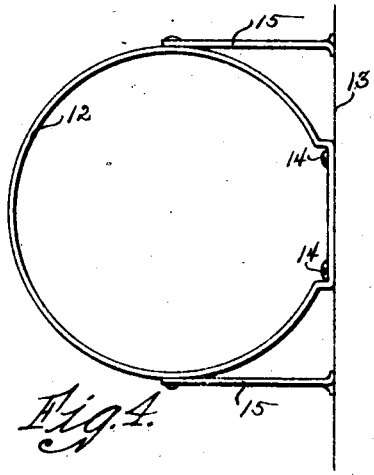
Fig. 4 is a top plan view of the bracket portion of the device secured to a supporting wall.

I have designated the basket of my device by the numeral 10, which may be of frustoconical shape as shown in the drawings and is preferably made of galvanized iron or other suitable material. Near the upper marginal edge of the basket is a horizontal peripheral bead 11 extending completely around the basket, the purpose of which will hereinafter be understood. The bracket for supporting the basket 10 comprises a ring 12 designed to be secured to the wall 13 by one or more screws 14, or other suitable means, as shown in Fig. 4. Secured on each side of this ring 12 at one of its ends by suitable means, is a supporting arm 15 which extends downwardly and toward the supporting wall 13 where its opposite end is secured thereto by a screw or the like 16. To place the basket in proper position for use, it is merely necessary to place the same in the ring 12 where the bead 11 will engage the ring 12 and thereby successfully support the basket. To remove the metal basket for cleaning or the renewing with fresh nesting material, it is merely necessary to lift the basket upwardly and out of the ring 12. In order that the screws 14 will not interfere with the basket 10 when the same is in place the ring 12 is bent for some distance adjacent the supporting wall 13, as shown in Fig. 4. This construction also prevents the ring 12 from any side movement.

Figure 1:
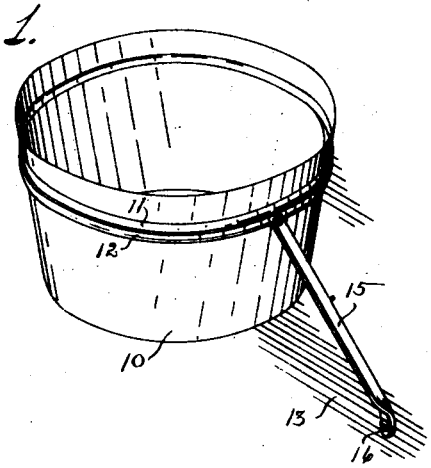
Fig. 1 is a perspective view of my complete sanitary poultry nest mounted on a supporting wall and ready for use.
Figure 2:
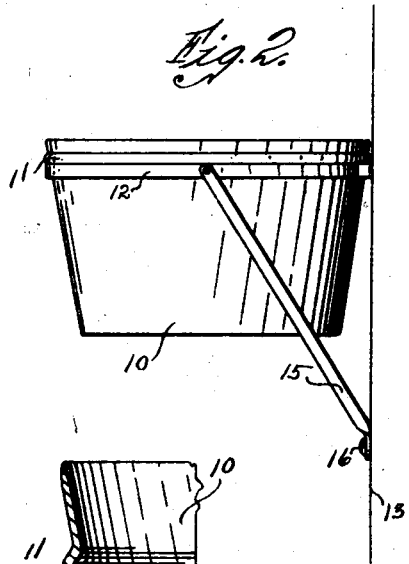
Fig. 2 is a side view of the same nest.
Figure 5:
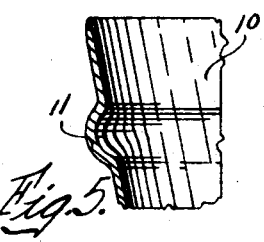
Fig. 5 is a side sectional view taken on line 5—5 of Fig. 3 of a top portion of the basket and more fully illustrates the peripheral bead on the side of the basket for supporting it in the bracket portion.
Figure 3:
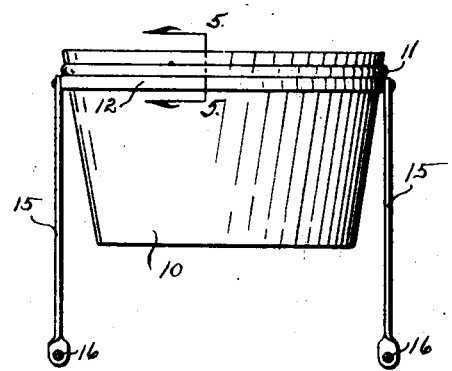
Fig. 3 is a front view of my device secured to a supporting wall and shows the position of the two bracket arms for supporting the same.
Figure 6:
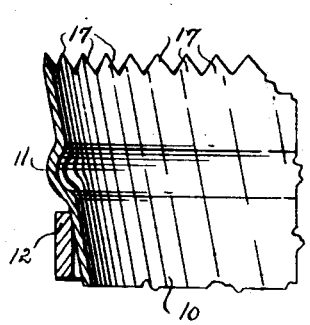
Fig. 6 is a side sectional view of the upper portion of a modified form of basket and shows teeth formed on the upper marginal edge of the basket for preventing the fowls from roosting upon the same.

To prevent the fowls from using the nest as a roost, the upper edge of the basket is very sharp, as shown in Fig. 5. In Fig. 6, I have shown a slightly modified form of basket to prevent the using of the basket as a roost by providing the teeth 17.

The complete construction is exceptionally durable and easily installed with only a screw driver or a hammer.

Some changes may be made in the construction and arrangement of my improved poultry nests without departing from the real spirit and purpose of my invention and it is my intention to cover by my claims any modified forms of structure or use of mechanical equivalents which may be reasonably included within their scope.

I claim:

1. In a device of the class described, a receiving ring having a straight portion in its length designed to make contact with a supporting surface, arms secured at one of their ends to said ring and designed to have their other ends secured to a supporting surface, a container open at its top capable of being placed in said ring, and a peripheral bead formed on said container for preventing the same from passing completely through said ring.

2. In a device of the class described, a receiving ring having a straight portion in its length designed to make contact with a supporting surface, arms secured at one of their ends to said ring and designed to have their ends secured to a supporting surface, a container open at its top capable of being placed in said ring, an endless peripheral bead formed on said container at a point near its upper portion for preventing the same from passing completely through said ring, and a sharp marginal edge formed on the rim of said container.

FREDERICK LAGE.